June 21, 1932.  F. S. DICKINSON  1,863,785
SYRINGE
Filed March 8, 1930
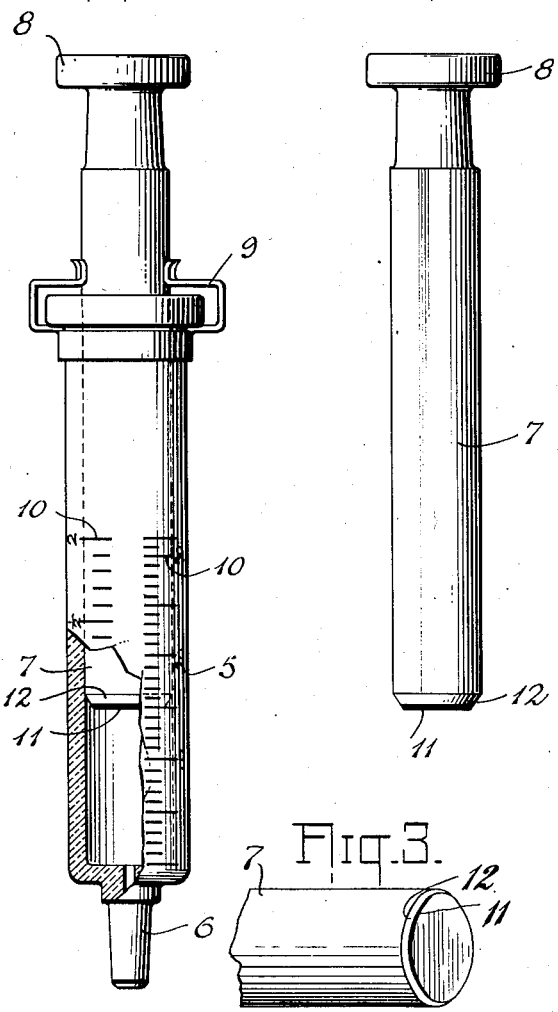
INVENTOR
FAIRLEIGH S. DICKINSON
BY
ATTORNEYS Patented June 21, 1932

1,863,785

UNITED STATES PATENT OFFICE

FAIRLEIGH S. DICKINSON, OF RUTHERFORD, NEW JERSEY

SYRINGE

Application filed March 8, 1930. Serial No. 434,192.

My invention relates to syringes and more particularly to hypodermic syringes for administering medicines, drugs and the like in accurate and predetermined doses. A syringe of the indicated class generally comprises a tubular glass barrel terminating at one end in a nozzle for the accommodation of the customary hypodermic needle, and a plunger slidable within said barrel for expelling the contents thereof through said needle. In existing forms of such syringes, the barrel is provided with a scale and the plunger carries an indicating mark for co-operation with said scale to indicate the amount of the contents of the barrel which are expelled by an inward operation of said plunger. In such constructions, the indicating mark on the plunger is located at a distance from the inner end face thereof, which necessitates locating the scale on the barrel in such a position that its one end is at a distance from the bottom of said barrel corresponding to the space between said indicating mark and the aforesaid inner end face of the plunger, in order that said indicating mark will reach all parts of said scale. This arrangement requires careful calculation in the location of the scale, and carries with it the possibility of incorrect location, and at the same time increases the cost of producing the syringe. At the same time, because of the conspicuous and independent visibility of the inner end of the plunger, in such existing arrangements, the user of the syringe is likely to use such end in cooperation with said scale as the guide for the operation of the syringe, with the result that incorrect quantities of medicines, drugs and the like may be administered and the operation of the syringe rendered faulty and inefficient. As in the case of certain medicines and drugs the dose thereof which it is safe to administer must be carefully and accurately calculated, this is a very serious and oftimes dangerous disadvantage.

The object of the present invention is to provide a syringe in which the indicating mark is located on the plunger so as to insure extreme accuracy in the dosages administered by the user of the syringe, and to avoid the necessity for any careful calculation with respect to the proper location of the scale lengthwise of the barrel.

Other more specific objects will appear from the description hereinafter and the features of novelty will be pointed out in the claims.

In the accompanying drawing which illustrates an example of the invention without defining its limits, Fig. 1 is an elevation partly broken away, of a syringe embodying the novel features, and Fig. 2 is an elevation of the plunger thereof.

Fig. 3 is a perspective view of the end of the plunger.

As shown in the drawing, the syringe comprises the customary tubular glass barrel 5 terminating at one end in a nozzle 6 or equivalent means, for the accommodation of the usual hypodermic needle in the conventional manner. A plunger 7 which may be made of glass or any other suitable material is arranged to slidably fit the interior of the barrel 5 and is provided at its outer end with a head or equivalent means 8 to facilitate the operation of said plunger 7 in the barrel 5. If desired, suitable clamping means 9 may be provided for frictional engagement with the plunger 7 to maintain the latter against unintentional sliding movements lengthwise of the barrel 5. The latter is provided with one or more scales 10 of suitable arrangement dependent upon the purpose for which the syringe is designed, and arranged lengthwise of said barrel 5 as shown in Fig. 1. For co-operation with said scale or scales 10 to visibly indicate the extent of movement of the plunger 7 into the barrel 5 whereby the amount of contents expelled from said barrel is accurately indicated at each operation of said plunger 7, the latter carries an indicating mark 11 located approximately flush with the inner end surface of said plunger 7. In the illustrated example, the indicating mark 11 is an annular mark extending circumferentially about the plunger 7 so as to lie flush with the inner end face thereof. In the preferred construction, the plunger 7 is provided with an annular bevel 12 at its inner end, and the indicating mark 11 is produced on said bevel 12 preferably so as to be located approximately flush with the inner end face of said plunger, as clearly shown in Fig. 2.

With the arrangement set forth, the indicating mark 11 is located at the inwardly advancing end of the plunger 7 and no part of the latter projects axially beyond said mark in the inward direction of movement of said plunger; the most conspicuous part of the plunger 7 which is represented by the aforesaid indicating mark 11, therefore coincides with its extreme inner end. In the operation of the syringe, the user thereof is thus enabled to follow the inward course of the inner end face of the plunger without special effort and may therefore concentrate his attention on bringing the indicating mark 11 into registry with that portion of the scale 10 which indicates the dosage to be hypodermically administered. The syringe is accordingly extremely accurate in administering doses of the desired amount with absolute uniformity and without the necessity for any particular attention other than to bring the indicating mark 11 into proper registry with the scale 10. In other words, there is no portion of the plunger 7 which has any tendency to distract the user's attention from the indicating mark 11, and the reading of the syringe with respect to the operation of the plunger is accomplished without any particular effort. By providing the plunger 7 with the bevel 12 at its inner end and by locating the indicating mark 11 on this bevel preferably so as to lie flush with the inner end face of said plunger, the mark 11 is spaced from the inner sides of the barrel 5 and consequently when the syringe is filled with fluid, the mark 11 can be viewed only through a part of the liquid content in the syringe. This causes the mark to appear more prominently than when the mark lies on a part of the plunger which is in contact with the inner wall of the barrel. When the mark 11 is arranged as an annulus as shown in the drawing, the presence of the bevel will cause the mark to be viewed through a liquid annulus which between the bevel 12 and the barrel wall 5 is prism-shaped. Furthermore, the mark 11 does not come into rubbing engagement with the interior surface of the barrel 5 when the syringe is in use and consequently said mark 11 is not subjected to any friction which might tend to obliterate it. At the same time, the bevel 12 facilitates the insertion of the plunger 7 into the barrel 5. It will be further observed from the drawing that the width of the mark 11 is materially less than the space between any of the lines constituting the scale 10, which makes for great accuracy of reading, impossible where the mark has a width approximately equal to or greater than that of the spaces between the graduation marks.

With the arrangement set forth, the indicating mark 11 is located at the bottom of the barrel 5 when the plunger 7 is fully inserted therein; as a result of this, the scale 10 may have its one end located in registry with the aforesaid bottom of the barrel 5 and extend lengthwise of the latter from this point without any further calculation other than to properly produce the divisions of said scale in the desired spacing upon said barrel.

In addition to its extreme accuracy and uniformity in operation, the syringe is capable of being produced with less trouble and effort than heretofore so that the cost thereof is materially reduced.

The novel syringe may be used with absolute assurance in the administering of medicines, drugs and the like which, because of their characteristics, are required to be handled with great care and with minute exactness. In other words, the possibility of administering incorrect dosages of dangerous medicines, drugs and the like is avoided, without the necessity for any particular care other than the concentration necessary to bring the indicating mark 11 into registry with that part of the scale 10 designating the quantity of the contents of the barrel 5 which is to be administered.

Various changes in the specific forms shown and described may be made within the scope of the claims without departing from the spirit of the invention.

I claim:

1. In a hypodermic syringe, the combination of a barrel having a cylindrical bore and provided with a scale arranged lengthwise thereof, a cylindrical plunger slidable within said barrel in close frictional contact with the inner walls of said barrel and having a conical bevelled portion at its forward edge and an indicating mark on the peripheral surface of said bevel, said mark being of contrasting color from that of the sides and end face of the plunger, whereby, when the barrel is filled with liquid, the mark on the lateral face of the bevel is normally viewable through an annular prismatic portion of the liquid and will appear as a sharply defined mark for visibly indicating, in cooperation with the scale on the barrel, the extent of movement of the plunger into the barrel.

2. In a hypodermic syringe, the combination of a barrel having a cylindrical bore and provided with a scale arranged lengthwise thereof, a cylindrical plunger slidable within said barrel in close frictional contact with the inner walls of said barrel and having a conical bevelled portion at its forward edge and an indicating mark on the peripheral surface of said bevel approximately coincident with the extreme inner reduced end portion of the plunger, said mark being of contrasting color from that of the sides and end face of the plunger whereby, when the barrel is filled with liquid, the mark on the forward end of the bevel is normally viewable through an annular prismatic portion of the liquid and will appear as a sharply defined mark for visibly indicating, in cooperation with the scale on the barrel, the extent of movement of the plunger into the barrel.

3. In a hypodermic syringe, the combination of a barrel having a cylindrical bore and provided with a scale arranged lengthwise thereof, a cylindrical plunger slidable within said barrel in close frictional contact with the inner walls of said barrel and having a conical bevelled portion at its forward edge and an indicating mark on the peripheral surface of said bevel approximately coincident with the extreme inner reduced end portion of the plunger, the said bevelled portion of the plunger end being unmarked between the said mark and the junction of the bevel with the cylindrical portion of the plunger, said mark being of less width than the said bevel and of contrasting color from that of the sides and end face of the plunger and of its unmarked bevelled portion, whereby, when the barrel is filled with liquid, the mark on the forward end of the bevel is normally viewable through an annular prismatic portion of the liquid and will appear as a sharply defined mark for visibly indicating, in cooperation with the scale on the barrel, the extent of movement of the plunger into the barrel.

4. In a hypodermic syringe, the combination of a barrel having a cylindrical bore and provided with a scale arranged lengthwise thereof, a cylindrical plunger having its one end in registry with the inner ejecting end face of the barrel slidable within said barrel in close frictional contact with the inner walls of said barrel and having a conical bevelled portion at its forward edge and an annular conical indicating marking on the peripheral surface of said bevel approximately coincident with the extreme inner reduced end portion of the plunger, the said bevelled portion of the plunger end being unmarked between the said marking and the junction of the bevel with the cylindrical portion of the plunger, said marking being of less width than the spaces between the lines of the scale on the barrel and of less width than the said bevel and of contrasting color from that of the sides and end face of the plunger and of its unmarked bevelled portion, whereby, when the barrel is filled with liquid the marking on the forward end of the bevel is normally viewable through an annular prismatic portion of the liquid and will appear as a sharply defined line for visibly indicating, in cooperation with the scale on the barrel, the extent of movement of the plunger into the barrel.

In testimony whereof I have hereunto set my hand.

FAIRLEIGH S. DICKINSON.